(12) United States Patent
Nolte et al.

(10) Patent No.: US 7,156,795 B2
(45) Date of Patent: Jan. 2, 2007

(54) TOOL CHANGE SYSTEM FOR A MACHINE

(75) Inventors: Hans J. Nolte, Stuttgart (DE); Rainer Melcher, Oberstenfeldt (DE); Michael Baumann, Weinbergsteige (DE); Stefano Giuliano, Gerlingen (DE)

(73) Assignee: Dürr Systems, Inc., Plymouth, MI (US)

( * ) Notice: Subject to any disclaimer, the term of this patent is extended or adjusted under 35 U.S.C. 154(b) by 404 days.

(21) Appl. No.: 10/360,773

(22) Filed: Mar. 26, 2002

(65) Prior Publication Data

US 2004/0192524 A1    Sep. 30, 2004

(30) Foreign Application Priority Data

Mar. 29, 2001    (DE) ................................. 101 15 467

(51) Int. Cl.
*B23Q 3/155* (2006.01)

(52) U.S. Cl. ............................ 483/13; 483/59; 483/901; 483/2; 483/9; 483/7; 483/67; 483/16; 901/43; 901/46; 901/49; 118/323; 239/722; 239/305

(58) Field of Classification Search ................ 483/59, 483/901, 7, 10, 58, 65–67, 69, 16, 2, 13, 483/8–9; 901/43, 46, 49; 118/323; 239/305, 239/750, 722
See application file for complete search history.

(56) References Cited

U.S. PATENT DOCUMENTS

| | | | |
|---|---|---|---|
| 4,376,135 A | 3/1983 | Patel et al. | |
| 4,404,728 A * | 9/1983 | Ishikawa | 483/13 |
| 4,521,462 A | 6/1985 | Smythe | |
| 4,572,437 A | 2/1986 | Huber et al. | |
| 4,589,597 A | 5/1986 | Robisch et al. | |
| 4,620,362 A * | 11/1986 | Reynolds | 483/9 |
| 4,637,121 A * | 1/1987 | Wortmann | 483/16 |
| 4,684,064 A | 8/1987 | Kwok | |
| 4,715,314 A | 12/1987 | Ramseier et al. | |
| 4,737,611 A * | 4/1988 | Humblot | 219/86.25 |
| 4,852,810 A | 8/1989 | Behr et al. | |
| 4,883,939 A * | 11/1989 | Sagi | 219/125.1 |
| 4,919,333 A | 4/1990 | Weinstein | |
| 4,927,081 A | 5/1990 | Kwok et al. | |
| 4,944,459 A | 7/1990 | Watanabe et al. | |
| 4,955,960 A | 9/1990 | Behr et al. | |
| 5,011,086 A | 4/1991 | Sonnleitner et al. | |
| 5,078,321 A | 1/1992 | Davis et al. | |
| 5,127,125 A | 7/1992 | Skibowski | |
| 5,281,194 A * | 1/1994 | Schneider | 483/14 |
| 5,294,217 A | 3/1994 | Talacko et al. | |
| 5,300,006 A | 4/1994 | Tanaka et al. | |
| 5,372,567 A * | 12/1994 | Whittington et al. | 483/29 |
| 5,397,063 A | 3/1995 | Weinstein | |
| 5,622,563 A | 4/1997 | Howe et al. | |

(Continued)

FOREIGN PATENT DOCUMENTS

DE    41 05 116 A 1    8/1992

(Continued)

*Primary Examiner*—Erica Cadugan
(74) *Attorney, Agent, or Firm*—Howard & Howard

(57) ABSTRACT

A plurality of atomizers or other tools are disposed in a mounting plate (10) in storage places (12), respectively. The mounting plate (10) is rotatable relative a paint robot of a coating installation and has a pneumatic lock or a tool holder (19) that can only be released automatically during storage of the atomizers by an external control device of the mounting plate.

6 Claims, 1 Drawing Sheet

U.S. PATENT DOCUMENTS

| | | | |
|---|---|---|---|
| 5,633,306 A | 5/1997 | Howe et al. | |
| 5,662,278 A | 9/1997 | Howe et al. | |
| 5,683,032 A | 11/1997 | Braslaw et al. | |
| 5,704,977 A | 1/1998 | Baumann et al. | |
| 5,865,380 A | 2/1999 | Kazama et al. | |
| 5,993,365 A * | 11/1999 | Stagnitto et al. | 483/59 |
| 6,037,010 A | 3/2000 | Kahmann et al. | |
| 6,090,450 A | 7/2000 | Kahmann et al. | |
| 6,508,610 B1 | 1/2003 | Dietrich | |
| 6,533,861 B1 * | 3/2003 | Matsuda et al. | 118/323 |
| 6,589,348 B1 | 7/2003 | Ott | |
| 2002/0115541 A1 * | 8/2002 | Patel et al. | 483/1 |
| 2004/0129208 A1 * | 7/2004 | Nolte et al. | 118/305 |

FOREIGN PATENT DOCUMENTS

| | | |
|---|---|---|
| DE | 43 42 128 A1 | 6/1995 |
| DE | 196 10 588 A 1 | 9/1997 |
| DE | 197 09 988 A 1 | 10/1998 |
| DE | 197 42 588 A 1 | 4/1999 |
| DE | 198 30 029 A 1 | 1/2000 |
| DE | 199 09 369 A 1 | 9/2000 |
| DE | 199 37 425 A 1 | 3/2001 |
| DE | 100 33 986 A 1 | 1/2002 |
| DE | 100 63 234 C 1 | 7/2002 |
| DE | 101 15 470 A1 | 10/2002 |
| DE | 101 30 173 A 1 | 1/2003 |
| EP | 0 767 005 A1 | 4/1997 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 1 172 152 A1 | 1/2002 |
| JP | 60-122071 A * | 6/1985 |
| WO | WO 94/22589 | 10/1994 |
| WO | WO-2001/03852 A1 * | 1/2001 |

* cited by examiner

TOOL CHANGE SYSTEM FOR A MACHINE

FIELD OF THE INVENTION

The invention concerns a tool change system for a machine with an automatically (multiaxis) moveable tool according to the preamble of the independent claim. In particular, a robot can be involved and its tool can be an atomizer for series coating of workpieces, like vehicle bodies.

BACKGROUND OF THE INVENTION

Tool change systems for painting robots, whose atomizer is fastened to a flange that forms the releaseable part, which is secured by pneumatic forces on a machine flange forming the fixed part, are state of the art. To release the atomizer, an air connection is operated by the robot itself for opening of a closure cylinder of the atomizer change device of the robot. This air supply by the robot itself can lead to unintentional release of the atomizer possibly during the coating operation during improper control, which not only results in mechanical damage and failure of the coating unit, but also results in an inadmissible hazard of explosion by separation of the electrical connections of the electrostatic atomizer.

SUMMARY OF THE INVENTION

The task of the invention is a tool change system in which the hazard of unintentional opening of the tool change device of the machine is reliably prevented.

This task is achieved by the features of the claims.

In the system described here, the tool change device contained in the machine can only be opened when the tool is reliably fixed in the external change station and coupled to the connections there. The tool in coating installations, in addition to an atomizer, can also be other tools, like hood openers, measurement devices, etc. It is also important in electrostatic painting robots or other coating machines that the atomizer be additionally grounded during loosening of its mouth by opening of the change device.

Control of the air connection expediently accessible on the outside of the robot or other machine can occur automatically in the change station, for example, with a compressed air signal or possibly by opening of the closure. The outer lying air connection has the additional advantage that, if necessary, rapid manual separation of the tool from the machine is also possible by means of a device similar to a manual air pump.

As an embodiment of the invention, the carousel-like change station for atomizers and other tools of a coating installation for series coating of vehicle bodies described in DE 101 15 470 is considered.

DETAILED DESCRIPTION OF THE PREFERRED EMBODIMENT

Figure 1:
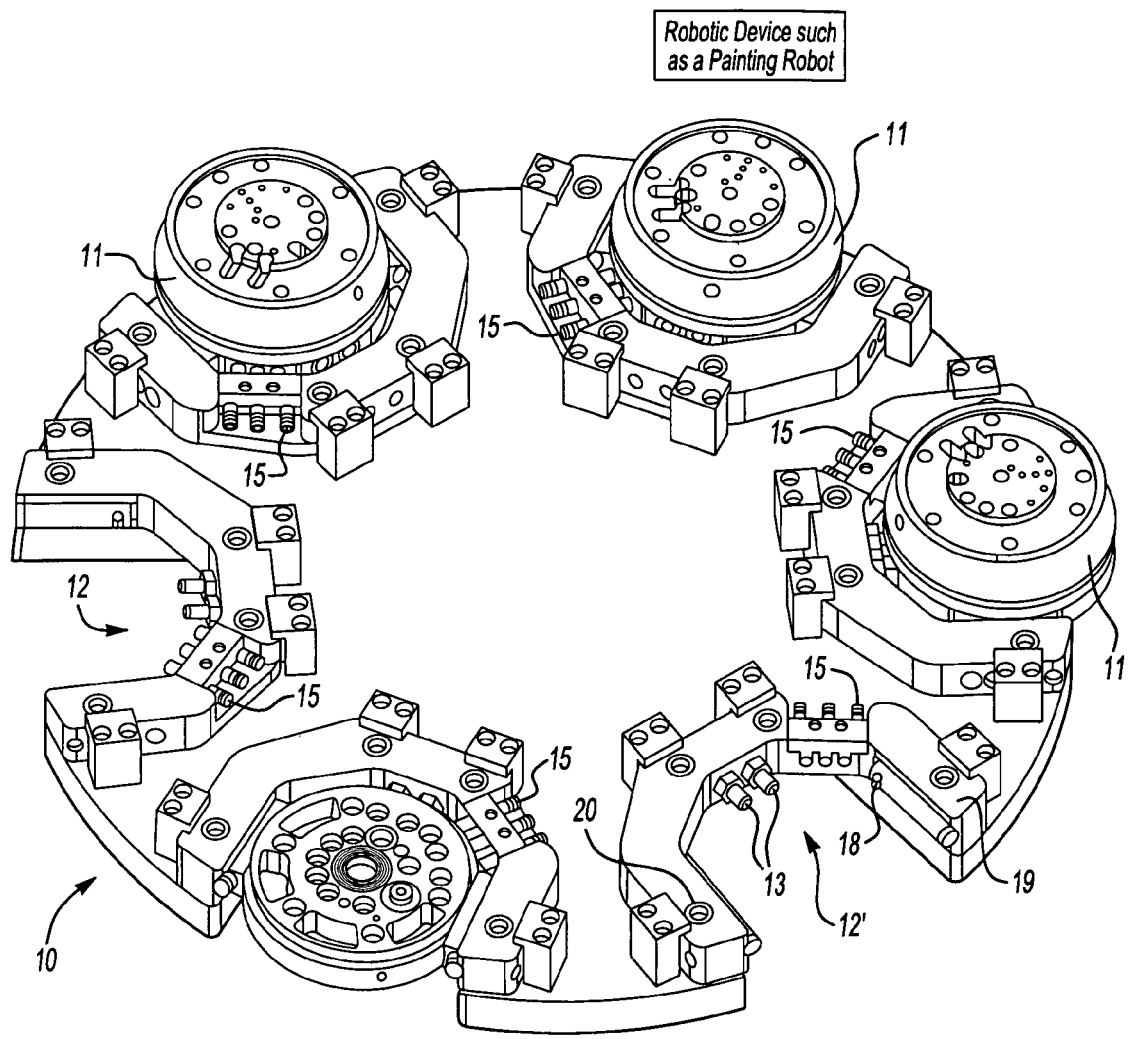
FIG. 1 shows the mounting plate of the change station.

Referring to FIG. 1, a mounting plate 10 defines a periphery and has six storage places 12 for the changeable (not shown) atomizer and/or other tools, like hood openers, measurement devices, and the like (not shown). Each atomizer and/or tool includes a flange part 11 releasable from a fixed part of a machine, for example, a painting robot, shown schematically in FIG. 1, that is secured during operation to the fixed part of the robot by a pneumatic cylinder closure. The mounting plate 10 is a carousel-like station rotatable relative to the painting robot. Alternatively, the mounting plate 10 is linearly movable (not shown) relative the painting robot.

Figure 2:
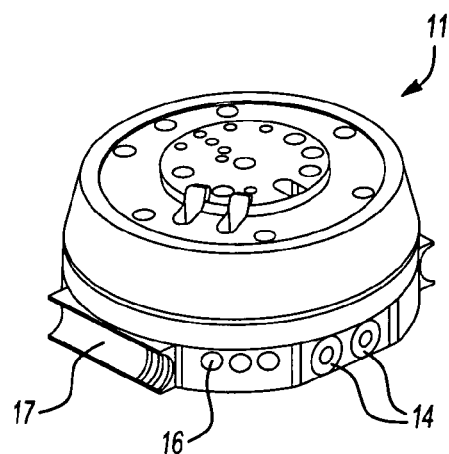
FIG. 2 shows the flange part of an atomizer insertable into the mounting plate.

The storage places 12 are formed by fork-like recesses into which the flange part 11 of the tools separable by the robot can be introduced in the direction of arrow 12'. A tool holder 19 mounted to float in all three spatial axes preferably has media connections defined by at least two connections 13 for air, rinsing agents and other operating media, identification devices 15 and an adjustable spring-loaded bolt 18. During insertion of the flange parts 11 into the storage places 12, air connections 14 arranged on the flange parts 11 (FIG. 2) and releaseably connected to the connections 13 between the uncoupled state and the coupled state. The connections 13 can also serve for grounding of the atomizer. The identification devices 15 of the storage places are connected during insertion of the atomizer to inserts 16 replaceably arranged in the flange part 11 for type recognition. The flange part 11 also has a centering 17 that engages in an adjustable spring-loaded bolt 18 during insertion of the flange part 11 into the storage place 12. Interaction of the bolt 18 with the centering device 17 serves for position fixation of the flange part 11 in the normal direction of the mounting plate 10. The elements apparent at 20 are a device formed, for example, by ball-check elements for centering of the storage fork in a prescribed position in a prism insert.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A tool change system for sequentially changing tools adaptable for coating workpieces comprising;

a robotic device for operably and replaceably holding one said tool;

a mounting unit defining a periphery with a plurality of storage locations each being adaptable for receiving a tool flange device of one said tool, said mounting unit being a carousel that is rotatable relative to said robotic device for placing said tool flange device in a position accessable by said robotic device;

a tool holding device disposed at each of said storage locations for pneumatically engaging and releasing said tool flange device as said tool flange device is accessed by said robotic device; and media connections cooperable with said mounting unit at each of said storage locations for flushing said tool flange device.

2. A tool change system as set forth in claim 1, wherein said media connections are fluidly communicated with said tool flange device for causing the pneumatic engaging of said tool flange device for locking said tool flange device inside said storage location.

3. A tool change system as set forth in claim 2, wherein said flange device is further defined by another connection adaptable for connecting to the media connections of the mounting unit when engaged inside said storage location.

4. A tool change system as set forth in claim 3 and further including an identification device.

5. A tool change system as set forth in claim 4, wherein said identification device, said tool holding device, and said media connections are operably communicated.

6. A tool change system as set forth in claim 1, wherein said media connections are adaptable for grounding at least one of the coating tools.

* * * * *